Robert W. Mousley
INVENTOR.

Robert W. Mousley
INVENTOR.

United States Patent Office 3,436,126
Patented Apr. 1, 1969

3,436,126
SAFETY CONNECTION BETWEEN VEHICLE FOOT AND EMERGENCY BRAKE SYSTEMS
Robert W. Mousley, 1396 W. 64th Terrace, Hialeah, Fla. 33012
Filed Oct. 11, 1966, Ser. No. 585,851
Int. Cl. B60t 13/74; F16d 65/14
U.S. Cl. 303—2
8 Claims

ABSTRACT OF THE DISCLOSURE

A means for automatically actuating the mechanical braking system of an automotive vehicle upon the failure of the hydraulic braking system of the vehicle. The aforementioned means is associated with the actuating foot pedal for the hydraulic brake system whereby upon abnormal travel of the actuating pedal an associated lever means picks up, and upon the next stroke of the brake actuating pedal, applies the vehicle's mechanical brakes to assist in stopping the vehicle.

The present invention relates to a safety device for vehicle brakes and more particularly to a safety device adapted to automatically interconnect the hydraulic and mechanical braking systems normally utilized in automotive vehicles in the event of the failure of the hydraulic system.

Numerous devices have been proposed heretofore for the actuation of auxiliary vehicle braking means in the event of a sudden loss of braking capability, such as might occur due to the rupturing of fluid carrying lines normally associated with hydraulic braking systems or the like. However, most of the systems proposed heretofore were somewhat unsatisfactory because of undue complexity, and the fact that they failed to maintain the braking pedal of the hydraulic braking system in its customary position subsequent to a hydraulic braking failure.

Thus, in this safety conscious age a great need still exists for a relatively simple, effective system for interconnecting the hydraulic and mechanical braking systems normally present in automotive vehicles in the event of the failure of the primary braking system of the vehicle.

Toward this end, it is a primary object of the present invention to provide a safety connection between vehicle primary and emergency brake systems wherein the safety connection will remain inoperative as long as conditions are normal in the primary hydraulic braking system and become operatively engaged to automatically actuate the mechanical braking or emergency system in response to the abnormal condition of the primary system.

Another object of the present invention is to provide a safety connection between vehicle primary and emergency brake systems which may be readily incorporated in existing automotive vehicles.

A further object of the present invention is to provide a novel safety connection between vehicle primary and emergency brake systems whereby the safety connection is established on the stroke of the brake pedal immediately subsequent to the abnormal travel of the pedal when actuating the primary hydraulic brake system.

Still a further object of the present invention is to provide a novel means of interconnecting the regular hydraulic brake system and mechanical brake system of a vehicle in the quickest possible time regardless of the nature of the failure in the hydraulic brake system.

Still a further object of the present invention is to provide a safety connection between a vehicle foot operated hydraulic primary and mechanical emergency brake systems so as to provide true emergency stopping capability as well as substantially normal operational capability subsequent to the failure of the vehicle's hydraulic braking system wherein at no time is the normal operation of the emergency or "parking" brake system affected.

Still a further object of the present invention is to provide a safety connection between vehicle foot operated primary and emergency brake systems which precludes the necessity of having to attempt to actuate a separately disposed foot or hand operated emergency brake system in the event of the failure of the primary system.

Still a further object of the present invention is to provide a brake safety connection of the aforementioned type which is inexpensive to manufacture and which can be readily installed in existing vehicles so as to insure the ready availability of braking power regardless of the failure of the vehicle's primary braking system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
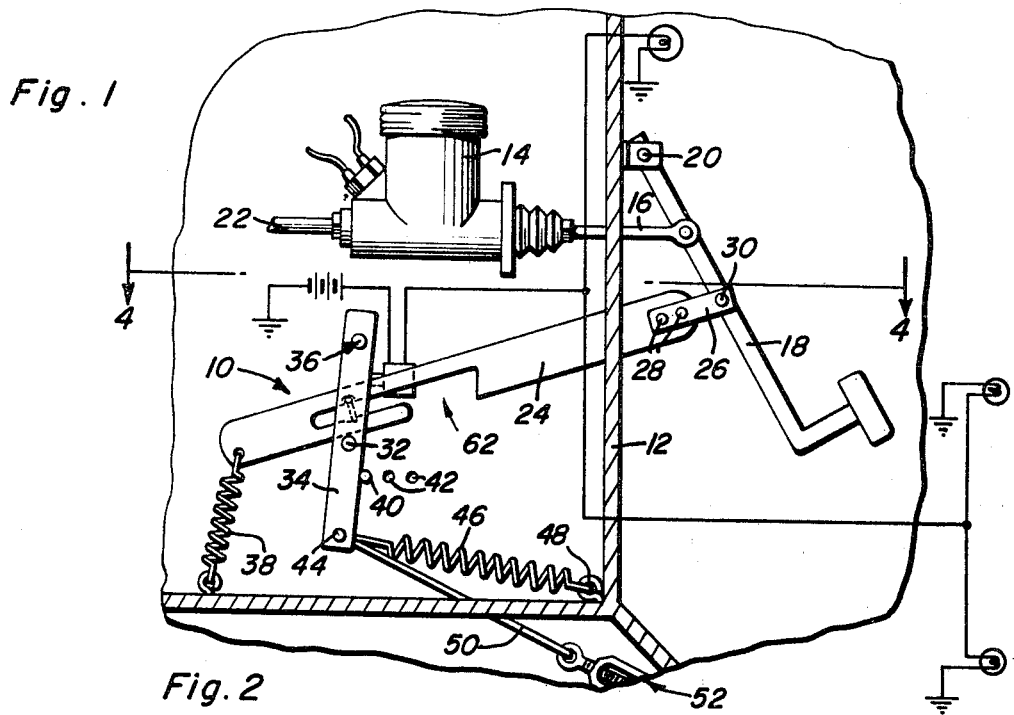
FIGURE 1 is a side elevational view of an exemplary embodiment of a safety connection between vehicle foot and emergency brake systems constructed in accordance with the present invention and shown operatively connected to the primary hydraulic braking system of a vehicle wherein the brake pedal is in its normal rest position.

Referring now to the drawings, it will be seen that the safety interconnection for vehicle braking systems indicated generally at 10 comprises which for purposes of clarity is shown in conjunction with a portion of a vehicle body and more particularly a fire wall 12.

The conventional primary hydraulically operated braking system illustrated includes a master cylinder 14 connected by a piston plunger 16 to a brake actuating foot pedal 18 pivoted as at 20 by conventional means from the fire wall 12. It will be understood that movement of the foot pedal 18 toward the fire wall 12 will force fluid out of the master cylinder 14 through its associated pressure line 22 so as to actuate the hydraulic wheel cylinders and brake shoes, not shown, of the conventional vehicle hydraulic braking system. The safety interconnection 10 includes a generally elongated slide bar 24 or link provided at one end, adjacent the foot pedal 18, with a pair of opposed rigidly secured mounting plates 26 secured as by riveting such as at 28 to either side of the slide bar 24 so as to form a bifurcation sized so as to be received about the foot pedal lever 18 and pivotally secured thereto at 30 by means of a suitable pivot pin and bearing.

The end of the slide bar 24 opposite the pivotal connection 30 normally glides on an anti-friction roller bearing 32 rotatably mounted between a pair of opposed parallel mechanical brake actuating lever bars 34 between which the bar 24 is slidably retained. The parallel bars 34 are pivotally secured to a portion of the vehicle body stationary with respect to the fire wall 12 by means of a suitable anti-friction pivot pin 36 adapted to permit the radially secured bars 34 to pivot about the pin 36 on or in a plane substantially the same as the plane in which the foot pedal lever 18 pivots from its associated pivot point 20. The slide bar 24, and particularly the lower edge thereof is normally maintained in rolling contact with the roller bearing 32 by means of a helical tensioning spring 38 having one end anchored in a suitable aperture adjacent the end of the bar 24 and the other end secured such as in a suitable eye secured to the fire wall 12. The mechanical brake actuating lever 34, in its normal position shown in FIGURE 1 wherein the brake pedal lever 18 is in its normally unactuated position, is at rest against a selectively removable threadably received stop pin 40 received in a suitable aperture in a portion of the vehicle body or fire wall 12. The relative position of the pin 40 may be selectively adjusted by threading it into suitable threaded apertures 42 so as to selectively limit the travel of the mechanical brake actuating lever 34 in a counterclockwise direction as seen in FIGURES 1–3, for reasons which will be discussed in detail with regard to the operation of the safety interconnection 10.

Adjacent the lower end of the mechanical brake actuating lever 34 there is provided a roller bearing 44 about which is received one end of a helical spring 46 having its other end secured as at 48 within a suitable eye secured to the fire wall 12 of the vehicle so as to normally tension the mechanical brake actuating lever 34 against the stop pin 40. The bearing 44 further retains one end of a mechanical brake actuating cable 50 which is operatively connected to the conventional hand or foot operated emergency brake actuating cable, not shown, such as at a point where the cable is provided with a Y-type connector or bifurcation adjacent its operative connection to the rear brake shoes of the vehicle. The brake actuating cable 50 is preferably provided with a suitable turnbuckle as indicated at 52 to facilitate adjusting the effective length of the cable 50 for reasons which will become apparent hereinafter.

The slide bar 24 is further provided with a longitudinally extending slot indicated generally at 60, at an intermediate point therein, which slot 60 communicates with the lower edge of the slide bar 24 such as indicated generally at 62. The portion 62 of the slot 60, as will be seen in FIGURES 1 and 2, does not normally come into registry with the roller bearing 32, i.e., during normal conditions wherein the hydraulic braking system of the vehicle is fully operative. The slide bar 24 is dimensioned and adjusted so as to always ride on the roller bearing 32 without permitting the spring 38 to urge the slide bar 24 downwardly to engage the roller bearing 32 within the slot 60. However, as may be seen in FIGURE 3, wherein as indicated heretofore the hydraulic braking system of the vehicle has failed, it will be understood that the roller bearing 32 has come into registry with the portion 62 of the slot 60 by virtue of the fact that the slide bar 24 has advanced, to the left, a distance greater than permitted under normal braking conditions thereby permitting the spring 38 to urge the slide bar downwardly so as to urge the roller bearing 32 through the portion 62 of the slot 60 and thus into the slot 60. Although not shown, as the vehicle operator upon sensing the failure of the hydraulic braking system momentarily attempts to pump, i.e., reciprocate the foot pedal lever 18, the slide bar 24 with the roller bearing 32 riding in the slot 60 will move a sufficient distance to the right so as to permit the roller bearing 32 to move past a spring-biased latch means 70 having one end pivotally secured to the slide bar 24 as at 72 and the distal end thereof normally resting against an abutment 74 so as to normally permit one way travel of the roller bearing 32 therepast within the slot 60. Thus, it will be appreciated as seen in FIGURES 2 and 3, the roller bearing 32 will be trapped within the portion 64 of the slot 60 so that upon subsequent clockwise rotation of the foot pedal lever 18 the latch 70 will come to rest against the roller bearing 32 thus pivoting the mechanical brake actuating lever 34 about its pivot 36 so as to move the actuating lever off its stop pin 40 and thus tension the mechanical brake actuating lever 50 against the bias of the spring 46 and the brake return springs, not shown, thereby automatically applying the mechanical brakes upon failure of the hydraulic brake actuating system.

Figure 2:
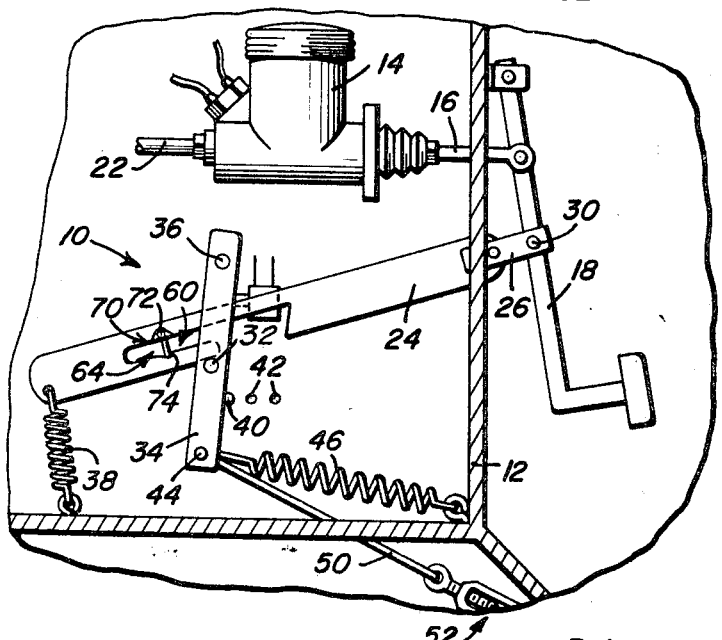
FIGURE 2 is a side elevational view similar to FIGURE 1 with the exception that the brake pedal is shown at the bottommost limit of its normal travel such as under normal braking conditions.
Figure 3:
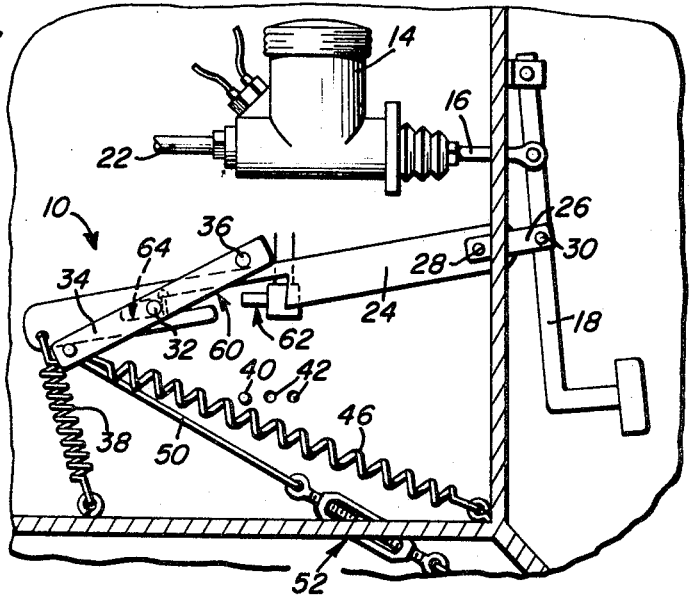
FIGURE 3 illustrates the manner in which the safety connection of the present invention cooperates to interconnect the hydraulic and mechanical braking systems of the vehicle upon abnormal travel of the brake pedal during an attempt to hydraulically actuate the vehicle brakes.
Figure 4:
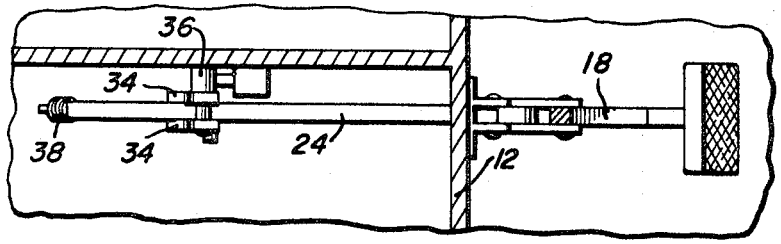
FIGURE 4 is a horizontal cross-sectional view of a portion of the safety connection of the present invention taken substantially along the plane of the line 4—4 of FIGURE 1.
Figure 5:
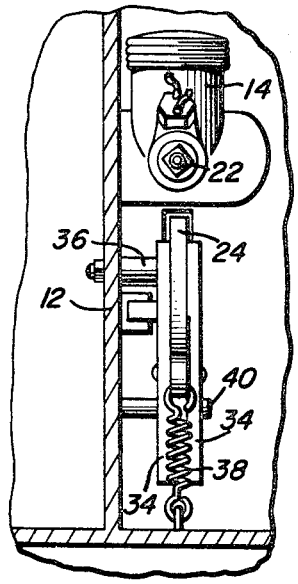
FIGURE 5 is an elevational view of the exemplary embodiment of the present invention.

From the foregoing it will be apparent that the roller bearing 32 will be retained within the portion 64 of the slot 60, as seen best in FIGURE 3, until such time as the hydraulic system of the vehicle has been repaired and the latch means 70 manipulated to allow the roller bearings 32 to pass thereby and accordingly drop out of the slot 60 through the portion 62 communicating with the edge of the slide bar 24 thus returning the safety interconnection 10 of the present invention to the standby position illustrated in FIGURE 1.

The foregoing is considered as illustrative only of the principles of the invention. Further, since numeorus modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle equipped with a primary normally operative hydraulic braking system and a secondary normally inoperative mechanical emergency braking system an auxiliary safety braking means including a primary and secondary system connecting means operatively associated with said primary and secondary systems and adapted to automatically actuate the mechanical brake system in response to an abnormal condition of a brake actuating pedal operatively associated with the primary hydraulic braking system of the vehicle, said primary and secondary system connecting means including a slide bar, means having one end pivotally secured to the brake actuating pedal of the primary braking system, a swingable lever having one end fixedly and pivotally secured to said vehicle, the other end of said swingable lever being operatively connected to said secondary braking system, latch means carried by said slide bar, detent means carried by said swingable lever, said latch means of said slide bar being adapted to automatically engage said detent means of said swingable lever so as to actuate said swingable lever to brake the vehicle by means of said secondary braking system in the event of the abnormal travel of the actuating pedal of the primary braking system.

2. The combination of claim 1 wherein said slide bar is provided with a longitudinally extending slot intermediate its ends, said slot communicating with the lower edge of said slide bar whereby said detent carried by said swingable lever will be engaged in said slot upon malfunction of the primary braking system thereby actuating said swingable lever to apply the secondary braking system.

3. The combination of claim 2 including a latch means secured to said slide bar and adapted to coact with said longitudinally extending slot to retain said detent of said swingable lever upon malfunction of the primary braking system of the vehicle.

4. The combination of claim 3 including means biasing said slide bar against said detent of said swingable lever.

5. The combination of claim 3 including stop means adjustably carried by said vehicle and interposed in the path of travel of said swingable lever to selectively limit the travel of said swingable lever and means carried by said swingable lever and said vehicle to normally bias said swingable lever against said stop means.

6. The combination of claim 3 wherein said actuating pedal of said primary braking system remains in a substantially normal position during actuation of the secondary braking system.

7. The combination of claim 3 including signal means visible in the passenger compartment of the vehicle to indicate when said primary and secondary systems are interconnected.

8. A safety connection adapted to automatically interconnect the primary fluid operated and secondary mechanically operated braking systems of a vehicle in the event of the malfunction of the primary braking system of the vehicle which comprises an auxiliary safety braking means including a primary and secondary system connecting means operatively associated with said primary and secondary systems and adapted to automatically actuate the mechanical brake system in response to an abnormal condition of a brake actuating pedal operatively associated with the primary hydraulic braking system of the vehicle, said primary and secondary system connecting means including a slide bar means having one end pivotally secured to the brake actuating pedal of the primary braking system, a swingable lever having one end rigidly and pivotally secured to said vehicle, the other end of said swingable lever being operatively connected to said secondary braking system, latch means carried by said slide bar, detent means carried by said swingable lever, latch means of said slide bar being adapted to automatically engage said detent means of said swingable lever so as to actuate said swingable lever to brake the vehicle by means of said secondary braking system in the event of the abnormal travel of the actuating pedal of the primary braking system.

References Cited

UNITED STATES PATENTS

| 2,116,882 | 5/1938 | Dickey. |
| 2,201,612 | 5/1940 | Fields. |
| 2,204,720 | 6/1940 | Avery. |

DUANE A. REGER, *Primary Examiner*

U.S. Cl. X.R.

188—106